United States Patent
Lefevre et al.

(10) Patent No.: US 8,374,394 B2
(45) Date of Patent: Feb. 12, 2013

(54) AUGMENTED REALITY METHOD AND DEVICES USING A REAL TIME AUTOMATIC TRACKING OF MARKER-FREE TEXTURED PLANAR GEOMETRICAL OBJECTS IN A VIDEO STREAM

(75) Inventors: Valentin Lefevre, Puteaux (FR); Nicolas Livet, Paris (FR)

(73) Assignee: Total Immersion, Suresnes (FR)

( * ) Notice: Subject to any disclaimer, the term of this patent is extended or adjusted under 35 U.S.C. 154(b) by 0 days.

(21) Appl. No.: 13/606,912

(22) Filed: Sep. 7, 2012

(65) Prior Publication Data

US 2013/0004022 A1 Jan. 3, 2013

Related U.S. Application Data

(63) Continuation of application No. 12/524,101, filed as application No. PCT/FR2008/000068 on Jan. 18, 2008.

(30) Foreign Application Priority Data

Jan. 22, 2007 (FR) ...................................... 07 52809

(51) Int. Cl.
*G06K 9/00* (2006.01)

(52) U.S. Cl. ..................................................... 382/103

(58) Field of Classification Search .......... 382/100–107; 348/169–172; 356/27–31; 73/488–492
See application file for complete search history.

*Primary Examiner* — Abita O Fitzpatrick
(74) *Attorney, Agent, or Firm* — Blue Capital Law Firm, P.C.

(57) ABSTRACT

Methods and devices for the real-time tracking of one or more objects of a real scene in a video stream for an augmented-reality application are disclosed herein.

15 Claims, 7 Drawing Sheets

AUGMENTED REALITY METHOD AND DEVICES USING A REAL TIME AUTOMATIC TRACKING OF MARKER-FREE TEXTURED PLANAR GEOMETRICAL OBJECTS IN A VIDEO STREAM

CROSS-REFERENCE TO RELATED APPLICATIONS

This application is a continuation of U.S. patent application Ser. No. 12/524,101, filed on Feb. 1, 2010, which is a 35 U.S.C. 371 Application of PCT/FR08/0068, filed Jan. 18, 2008, which claims the benefit of French Application No. 0752809, filed Jan. 22, 2007, the entire disclosures of which are incorporated herein by reference.

FIELD

The present invention concerns the combination of real and virtual images, also known as augmented reality, and more particularly an augmented reality method and augmented reality devices using real time automatic tracking of marker-free textured planar geometrical objects in a video stream.

The object of augmented reality is to insert one or more virtual objects into the images of a video stream. Depending on the type of application, the position and orientation of these virtual objects can be determined by data linked to certain elements of that scene, for example coordinates of a particular point in the scene such as the hand of a player or by data external to the scene represented by the images, for example coordinates obtained directly from a game scenario. If the position and orientation are determined by data linked to certain elements of that real scene, it may be necessary to track those elements as a function of movements of the camera or movements of those elements themselves within the scene. The operations of tracking elements and embedding virtual objects in the real images can be executed by separate computers or by the same computer.

There exist a number of methods for tracking elements in an image stream. Element tracking algorithms, also called target pursuit algorithms, generally use a marker, which can be a visual marker, or other means such as radio-frequency or infrared marker means. Alternatively, some algorithms use shape recognition to track a particular image in an image stream.

The Ecole Polytechnique Federate de Lausanne has developed a visual tracking algorithm using no marker and the originality of which lies in matching particular points between the current image of a video stream with a key image, called a keyframe, obtained on initialization of the system and a key image updated during the visual tracking.

The objective of this visual tracking algorithm is to find, in a real scene, the pose, i.e. the position and orientation, of an object for which the three-dimensional meshing is available, or to find extrinsic position and orientation parameters of an immobile camera filming that object, thanks to image analysis.

The current video image is compared with one or more stored key images to find a large number of matches between those pairs of images in order to estimate the pose of the object. To this end, a key image is composed of two elements: an image captured from the video stream and a pose (orientation and position) of the real object appearing in that image. It is necessary to distinguish between "offline" key images and "online" key images. Offline key images are images extracted from the video stream in which the object to be tracked has been placed manually using a pointing device such as a mouse or using an adjustment tool such as a Pocket Dial sold by the company Doepfer. Offline key images characterize preferably the pose of the same object in a number of images. They are created and stored "offline", i.e. outside the ongoing regime of the application. Online images are stored dynamically during execution of the tracking program. They are calculated when the error, that is to say the distance between the matches of the points of interest, is low. Online key images replace offline key images used to initialize the application. Their use aims to reduce the offset, also known as drift, that can become large on moving too far from the initial relative position between the camera and the object. Learning new online key images also makes the application more robust to external light variations and to camera colorimetry variations. However, they have the disadvantage of introducing a "vibration" effect into the pose of the object in time. On learning a new online key image, the latter image replaces the preceding offline or online key image. It is used as the current key image.

Each offline or online key image includes an image in which the object is present and a pose for characterizing the placement of that object and a number of points of interest that characterize the object in the image. For example, the points of interest are constructed using a Harris point detector and represent locations in the image with high directional gradient values.

Before initializing the application, it is necessary to determine one or more offline key images. These are generally images extracted from the video stream, that contain the object to be tracked and associated with a position and an orientation of the three dimensional model of that object. To this end, an operator visually matches a wire model to the real object. The manual preparation phase therefore consists in finding a first estimate of the pose of the object in an image extracted from the video stream, which amounts to formalizing the initial affine transformation $T_{p \to c}$, the matrix for passing between the frame of reference attached to the tracked object and the frame of reference associated with the camera. The initial affine transformation can be divided into a first transformation $T_{o \to c}$ relating to an initial position of the object, for example at the center of the screen, i.e. a transformation linked to the change of frame of reference between the frame of reference of the camera and the frame of reference of the object, and a second transformation $T_{p \to o}$ relating to the displacement and rotation of the object from its initial position at the center of the screen to the position and orientation in which the object is really located in the key image, where $T_{p \to c} = T_{p \to o} * T_{o \to c}$. If the values $\alpha$, $\beta$ and $\gamma$ correspond to the translation of the object from its initial position at the center of the image to its position in the key image and if the values $\theta$, $\phi$ and $\varphi$ correspond to the rotation of the object from its initial position at the center of the image to its position in the key image about the axes x, y and z, the transformation $T_{p \to o}$ can then be expressed in the form of the following matrix:

$$T_p^o = \begin{bmatrix} \cos\varphi\cos\phi + \sin\varphi\sin\theta\sin\phi & \sin\varphi\cos\phi - \cos\varphi\sin\theta\sin\phi & \cos\theta\sin\phi & \alpha \\ -\sin\varphi\cos\theta & \cos\varphi\cos\varphi & \sin\theta & \beta \\ \sin\varphi\sin\theta\cos\phi - \cos\varphi\sin\phi & -\cos\varphi\sin\theta & \cos\theta\cos\phi & \gamma \\ 0 & \cos\phi - \sin\varphi\sin\phi & 0 & 1 \end{bmatrix}$$

Using this model establishes, the link between the coordinates of points of the three-dimensional model of the object in the frame of reference of the object and the coordinates of those points in the frame of reference of the camera.

On initialization of the application, the offline key images are processed to position points of interest as a function of the parameters chosen on launching the application. Those parameters are specified empirically for each type of use of the application, modulate the match detection core and produce better quality in estimating the pose of the object according to the characteristics of the real environment. Then, if the real object in the current image is in a pose that is close to the pose of that same object in one of the offline key images, the number of matches becomes high. It is then possible to find the affine transformation for keying the virtual three-dimensional model of the object to the real object.

When such a match has been found, the algorithm goes to the ongoing, regime. Displacements of the object are tracked from one frame to the other and any drift is compensated using information contained in the offline key image retained at initialization time and in the online key image calculated during execution of the application.

The tracking application combines two types of algorithm: detection of points of interest, for example a modified version of Harris point detection, and a technique of reprojection of the points of interest positioned on the three-dimensional model to the image plane. This reprojection predicts the result of spatial transformation from one frame to another. These two algorithms when combined provide for robust tracking of an object according to six degrees of freedom.

Generally speaking, a point p of the image is the projection of a point p of the real scene where $p \sim P_I \cdot P_E \cdot T_{p \to c} \cdot P$ is the matrix of the intrinsic parameters of the camera, i.e. its focal value, the center of the image and the offset, $P_E$ is the matrix of the extrinsic parameters of the camera, i.e. the position of the camera in the real space, and $T_{p \to c}$ is the matrix for passing between the frame of reference associated with the tracked object and the frame of reference of the camera. Only the position of the object relative to the position of the camera is considered here, which amounts to placing the frame of reference of the real scene at the optical center of the camera. This produces the equation $p \sim P_I \cdot P_E \cdot P_{p \to c} \cdot P$. The matrix $P_I$ being known, the tracking problem therefore consists in determining the matrix $T_{p \to c}$, i.e. the position and the orientation of the object relative to the frame of reference of the camera.

However, it is important to note that if the error measurement gets too high, i.e. if the number of matches between the current key image and the current image gets too small, tracking is desynchronized (the estimate of the pose of the object is considered to be no longer sufficiently coherent) and a new initialization phase is necessary.

The pose of an object is estimated according to the matches between the points of interest of the current image from the video stream, the points of interest of the current key image and the points of interest of the preceding image from the video stream. These operations are referred to as the matching phase. From the most significant correlations, the software calculates the pose of the object corresponding best to the observations.

FIGS. 1 and 2 illustrate this tracking application.

Alternatively, during the phase of creating key images off line, the pose of an object can be determined according to the configuration of its characteristic points. For this purpose, image blocks centered on points of interest are generated from key images off line in accordance with affine transformations or homographic deformations. These image blocks and the image blocks obtained after transformation are called patches. Here a patch can be defined as an image block including a point of interest and with which is associated the pose of the corresponding object. The pose of each patch is calculated according to the transformation effected to obtain the corresponding image block.

The patches are preferably arranged according to a decision tree to limit the calculation times during execution of the tracking application. Accordingly, for each image from a video stream, the object tracking application determines certain points of interest of that image and compares the image blocks centered on those points with the patches previously created to determine the pose of the object in the image. However, this solution also induces a "vibration" effect in the pose of the object in time.

The object tracking solutions proposed for augmented reality applications often stem from research and do not take into account the constraints of building commercial systems. In particular, problems linked to robustness, to the possibility of launching the application quickly without necessitating a manual initialization phase, to the detection of "desynchronization" errors (when an object to be tracked is "lost") and to the automatic reinitialization in real time after such errors are often ignored.

The invention solves at least one of the problems described above.

The invention therefore relates to a method for tracking in real time at least one substantially plane geometrical object from a real scene in at least two substantially consecutive images of at least one video stream, in an augmented reality application, this method being characterized in that it comprises the following steps:

reception of first image from said at least one video stream, said first image including said at least one object to be tracked;

determination of the position and the orientation of said at least one object to be tracked in said first image on the basis of a plurality of image blocks determined beforehand, each image block of said plurality of image blocks being associated with a pose of said at least one object to be tracked, said first image and the position and the orientation of said at least one object to be tracked in said first image being referred to as a key image;

reception of a second image from said at least one video stream, said second image including said at least one object to be tracked; and evaluation of the position and the orientation of said at least one object to be tracked in said second image on the basis of said key image.

Thus the method of the invention automates the initialization of an augmented reality application using automatic tracking in real time of marker-free planar textured geometrical objects in a video stream. This method also provides for reinitializing the application in the event of desynchronization, i.e. if the object to be tracked is lost.

In one particular embodiment the steps of reception of an image and evaluation of the position and the orientation of said at least one object to be tracked in said received image are repeated for images of said at least one video stream after said second image, in order to track said at least one object in a sequence of images.

The position and the orientation of said at least one object to be tracked in said received image are advantageously evaluated on the basis of said plurality of image blocks if the position and the orientation of said at least one object to be tracked cannot be evaluated in said received image on the basis of said key image, to enable automatic reinitialization if the object to be tracked is lost.

Also in one particular embodiment, the values of said key image are replaced by a received image and by the evaluated position and orientation of said object to be tracked in said received image, to improve the tracking of said at least one object to be tracked.

Also in one particular embodiment, the method further comprises a step of evaluation of the pose of the image sensor from which said at least one video stream is obtained in a frame of reference linked to said real scene on the basis of the evaluated position of said at least one object to be tracked. The method advantageously further comprises a step of determination of the movement of said image sensor. This embodiment tracks the movement of said image sensor if said at least one object to be tracked is immobile in the scene observed by said image sensor.

In one particular embodiment, said at least one object to be tracked includes an area of uniform color adapted to use the chromakey technology, enabling an element to be inserted into the uniform color area of the image.

Again, in one particular embodiment, said at least one object to be tracked is tracked simultaneously in at least two separate video streams, in particular to enable the implementation of collaborative application.

Again in one particular embodiment, the method further comprises a step of insertion of at least one element in at least one of said received, images according to the evaluated position and orientation of said at least one object to be tracked in said received image, said at least one element being selected from a list comprising at least one representation of at least one virtual object and at least one second video stream, in order to enrich the image from said image sensor.

The invention also consists in a computer program including instructions adapted to the execution of each of the steps of the method described above.

The invention further consists in removable or non-removable information storage means, partly or hilly readable by a computer or a microprocessor, containing code instructions of a computer program for executing each of the steps of the method described above.

The invention also consists in a device for tracking in real time at least one substantially plane geometrical object from a real scene in at least two substantially consecutive images of at least one video stream, in an augmented reality application, this device being characterized in that it comprises the following means:

means for receiving a first image from said at least one video stream, said first image including said at least one object to be tracked;

means for storing said first image in first storage means;

means for determining the position and the orientation of said at least one object to be tracked in said first image on the basis of a plurality of image blocks stored beforehand in second storage means, each image block of said plurality of image blocks being associated with a pose of said at least one object to be tracked, said pose being stored in said second storage means, the position and the orientation of said at least one object to be tracked in said first image being stored in said first storage means;

means for receiving a second image from said at least one video stream, said second image including said at least one object to be tracked; and means for evaluating the position and the orientation of said at least one object to be tracked in said second image on the basis of data, stored in said first storage means.

Thus the device of the invention automates the initialization or reinitialization of an augmented reality application using automatic tracking in real time of marker-free textured planar geometrical objects in a video stream.

In one particular embodiment the device further comprises means for determining if the position and the orientation of said at least one object to be tracked can be evaluated in said second image on the basis of data stored in said first storage means, said means for determining the position and the orientation of said at least one object to be tracked in said first image on the basis of data stored in said second storage means being adapted to evaluate the position and the orientation of said at least one object to be tracked in said second image on the basis of data stored in said second storage means. The device of the invention therefore reinitializes the application automatically if the object to be tracked is lost.

Again in one particular embodiment, the device father comprises means for storing said second image and the position and the orientation of said at least one object to be tracked in said second image in said first storage means, in order to improve the tracking of said at least one object.

Again in one particular embodiment, the device further comprises transformation means adapted to determine, the pose of said at least one object to be tracked or of the image sensor from which said at least one video stream is obtained in one of the frames of reference linked to said real scene, to said at least one object to be tracked, or to said image sensor, in order to determine the relative movements of said at least one object to be tracked and said image sensor in said real scene.

In one particular embodiment, the device further comprises means for inserting at least one element into at least one of said received images according to the evaluated position and orientation of said at least one object to be tracked in said received image, said at least one element being chosen in a list comprising at least one representation of at least one virtual object and at least one second video stream, in order to enrich, the image from said image sensor.

Other advantages, objects and features of the present invention emerge from the following detailed description given by way of nonlimiting example with reference to the appended drawings, in which.

Figure 5:
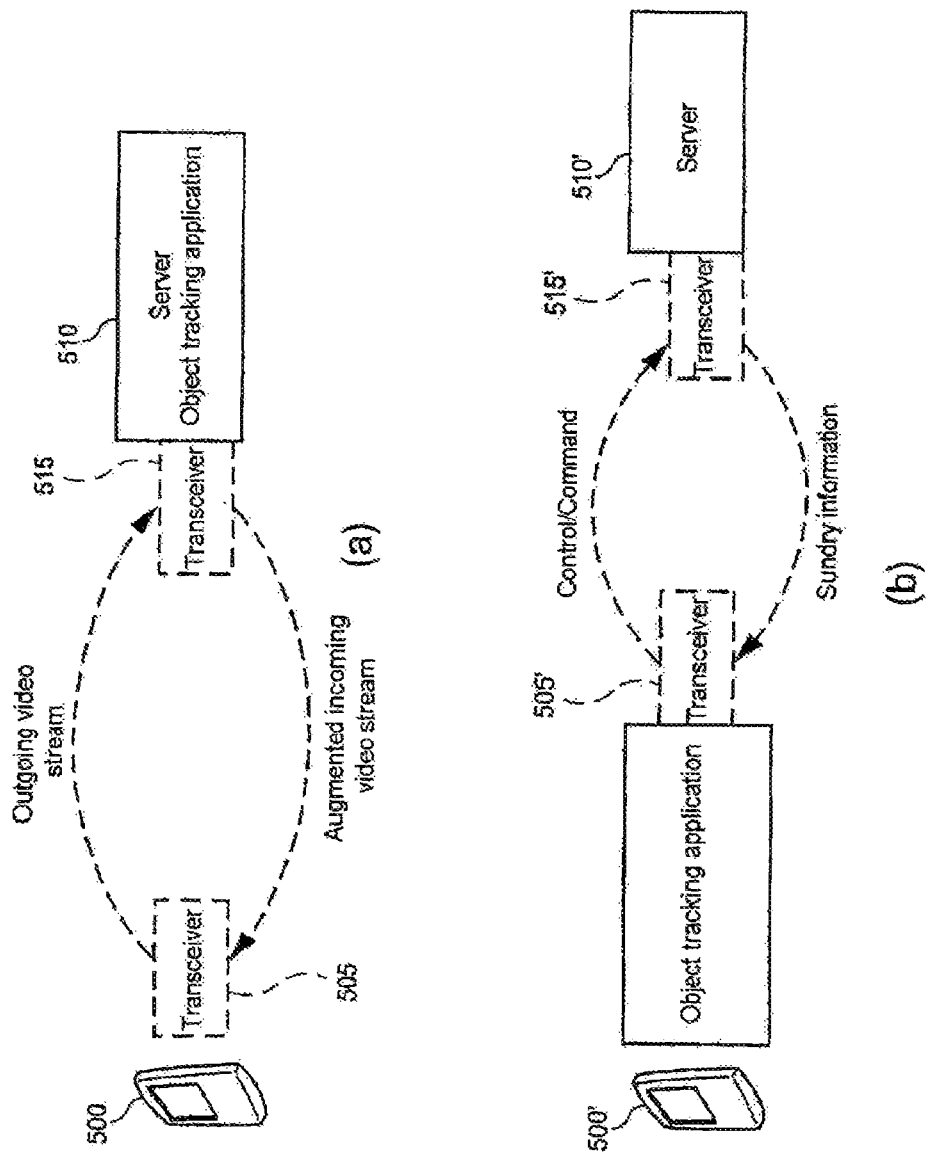
Figure 6:
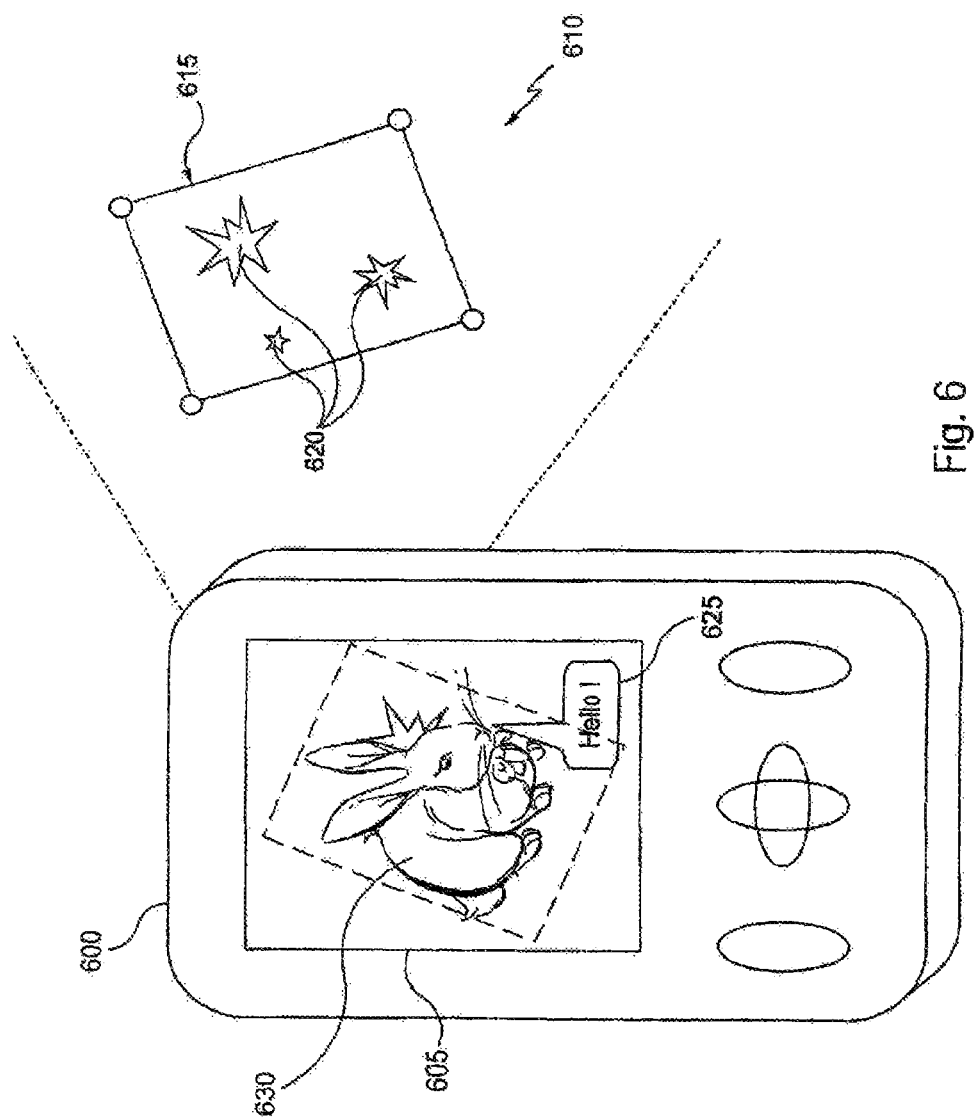
Figure 7:
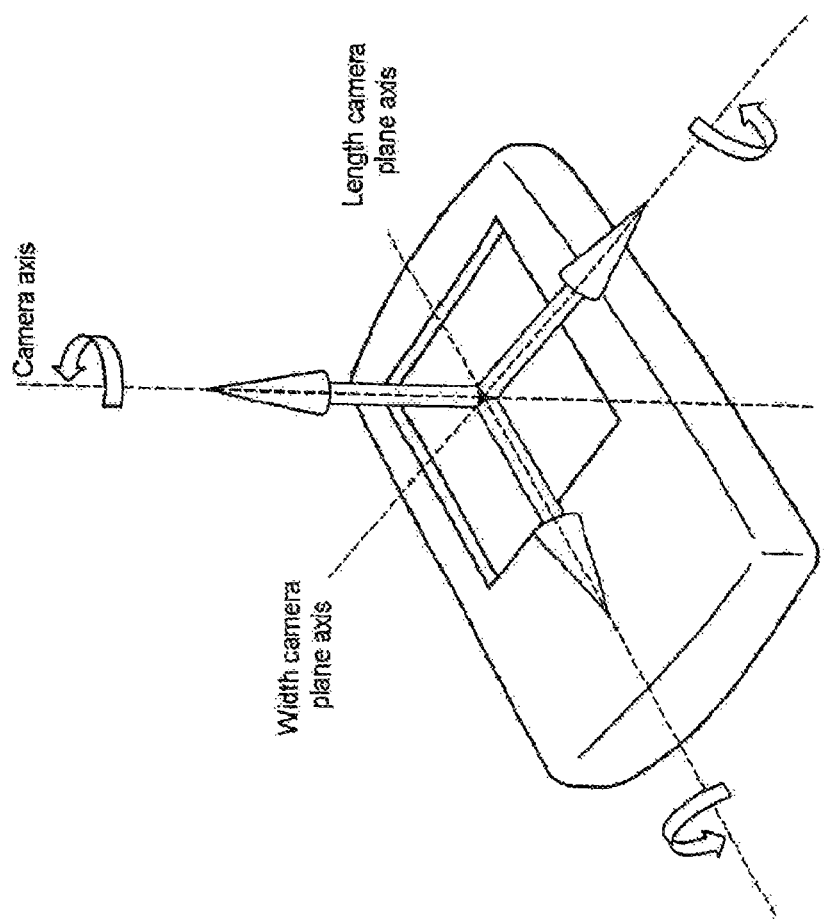

FIG. 5, comprising FIGS. 5a and 5b, shows two examples of architectures that can be used if a mobile image capture and display device is used;

FIG. 6 shows an example of using a mobile image capture and display device for an augmented reality application using object tracking; and FIG. 7 shows how a mobile image capture and display device can be used as a cursor or a movement sensor with six degrees of freedom.

Figure 1:
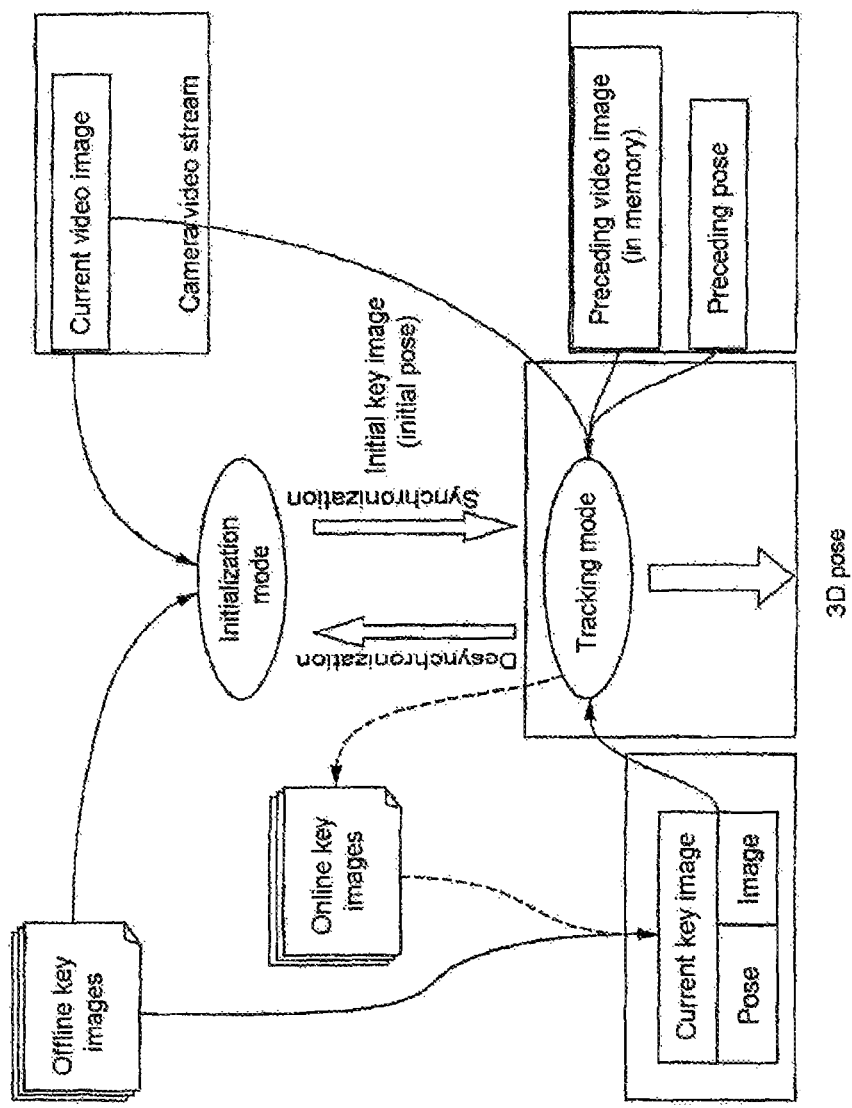
FIG. 1 represents diagrammatically the essential principles of the object tracking application developed by the Ecole Polytechnique Federate de Lausanne.
Figure 2:
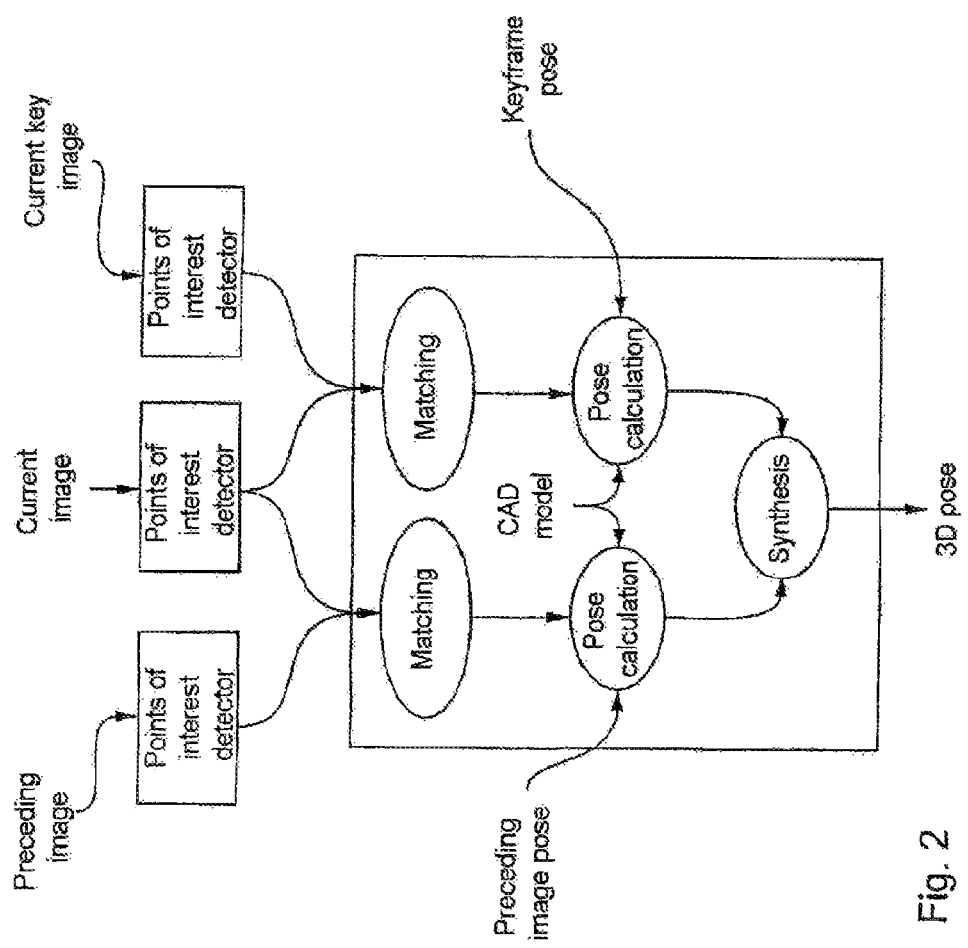
FIG. 2 illustrates certain steps of the method for determining the pose of an object in an image from a video stream from key images and the preceding image from the video stream.
Figure 3:
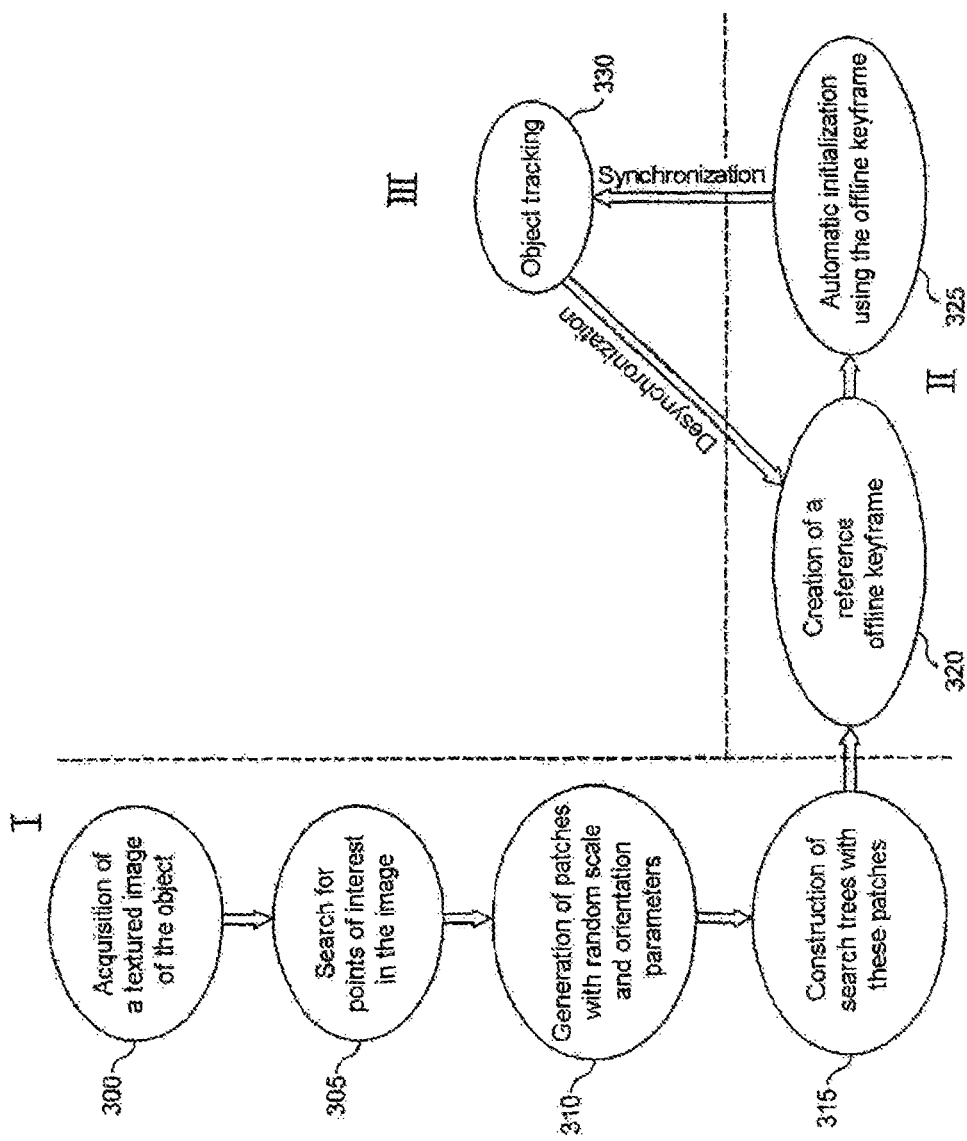
FIG. 3 shows the general diagram of an object tracking algorithm of the invention.

A particular object of the method of the invention is to automate initialization and reinitialization phases after desynchronization of the application for object tracking in images from a video stream. FIG. 3 shows the general diagram of the object tracking application using the invention.

As shown in FIG. 3, the object tracking application comprises three phases: a preparation phase (I), an initialization or reinitialization phase (II), and an object tracking phase (III).

The preparation phase (I) consists primarily in extracting the characteristic points of the object to be tracked in order to prepare a search tree. After acquiring a textured image of the object (step 300), the points of interest of the image are located (step 305) using a standard algorithm such as a Harris points detector, for example. A textured image of the object is preferably an image in which only the object appears, such as a synthetic image or an image in which the object has been cropped and the background eliminated.

When the points of interest of the object have been determined, the application extracts the image blocks centered on these points in order to generate patches. The patches are generated (step 310) by random transformations based on translations, rotations and changes of scale, for example. It is possible, for example, to effect the affine transformation defined by the following equation around the point of interest $m_0$ of the image:

$$(n-n_0)=H(m-m_0)+T(t_1,t_2)$$

where the point n is the transformation of the point m, $T(t_1,t_2)$ corresponds to a translation about the point $m_0$, $t_1$ being a small vertical translation in the image and $t_2$ being a small horizontal translation, and $H=R_\alpha \cdot R_\beta^{-1} \cdot S(\lambda_1, \lambda_2) \cdot R_\beta$. $R_\alpha$ and $R_\beta^{-1}$ correspond to rotations about two orthogonal axes and $S(\lambda_1, \lambda_2)$ represents the change of scale. The parameters to be varied at random are therefore $\alpha$, $\beta$, $\lambda_1$, $\lambda_2$, $t_1$ and $t_2$.

Each patch is associated with a pose that is calculated according to the transformation applied to the image block to obtain the corresponding patch. A search tree is then constructed from the patches generated (step 315).

During the initialization phase (II), an offline key image is created from a first image from the video stream (step 320). This first image from the video stream is stored to be used as an offline key image for tracking the object in subsequent images from the video stream. To determine the pose of the object in this first image, a number of points of interest are determined, for example the p points with the greatest directional gradient. The image block defined around each of these points is compared to the patches determined during the preparation phase, according to the search tree. The size of these image blocks is preferably equal to that of the patches. The pose associated with each of the patches most similar to the image blocks is used to determine the pose of the object in the image. The pose of the object can be defined as the mean of the poses of each patch selected, i.e. of each patch the most similar to each of the image blocks, or according to a voting mechanism. The pose determined in this way is associated with the image from the video stream to form the offline key image. That offline key image is then used to initialize the tracking application (step 325). This process is fast and provides instant initialization.

If the pose of the object is determined in the first image and the current key image is selected (offline key image determined during the initialization phase), the tracking application can locate the object (phase III) in the successive images of the video stream using the tracking mechanism referred to above (step 330). According to this mechanism, movements of the object (movement of the object in the scene or movement induced by movement of the camera in the scene) are tracked from one frame to another and any drift is compensated using information contained in the offline key image retained at initialization time and, where applicable, in the online key image calculated during execution of the application. The tracking application advantageously combines algorithms for detecting points of interest and for reprojecting points of interest positioned on the three-dimensional model to the plane image to provide the result of a spatial transformation from one frame to another. The pose of the object is thus estimated according to the matches between the points of interest of the current image from the video stream, the points of interest of the current key image, and the points of interest, of the preceding image from the video stream, i.e. according to the matching of the points of interest obtained from those images.

If the measured error becomes too high, i.e. if the number of matches between the current key image and the current image becomes too low, tracking is desynchronized and a reinitialization phase is necessary. The reinitialization phase is similar to the initialization phase described above (steps 320 and 325). During this phase, the current image from the video stream is used to form the new offline key image the pose of which is determined according to its points of interest and the search tree comprising the patches determined during the preparation phase. The offline key image is thus a dynamic offline key image that is updated automatically if the tracking application desynchronizes.

Figure 4:
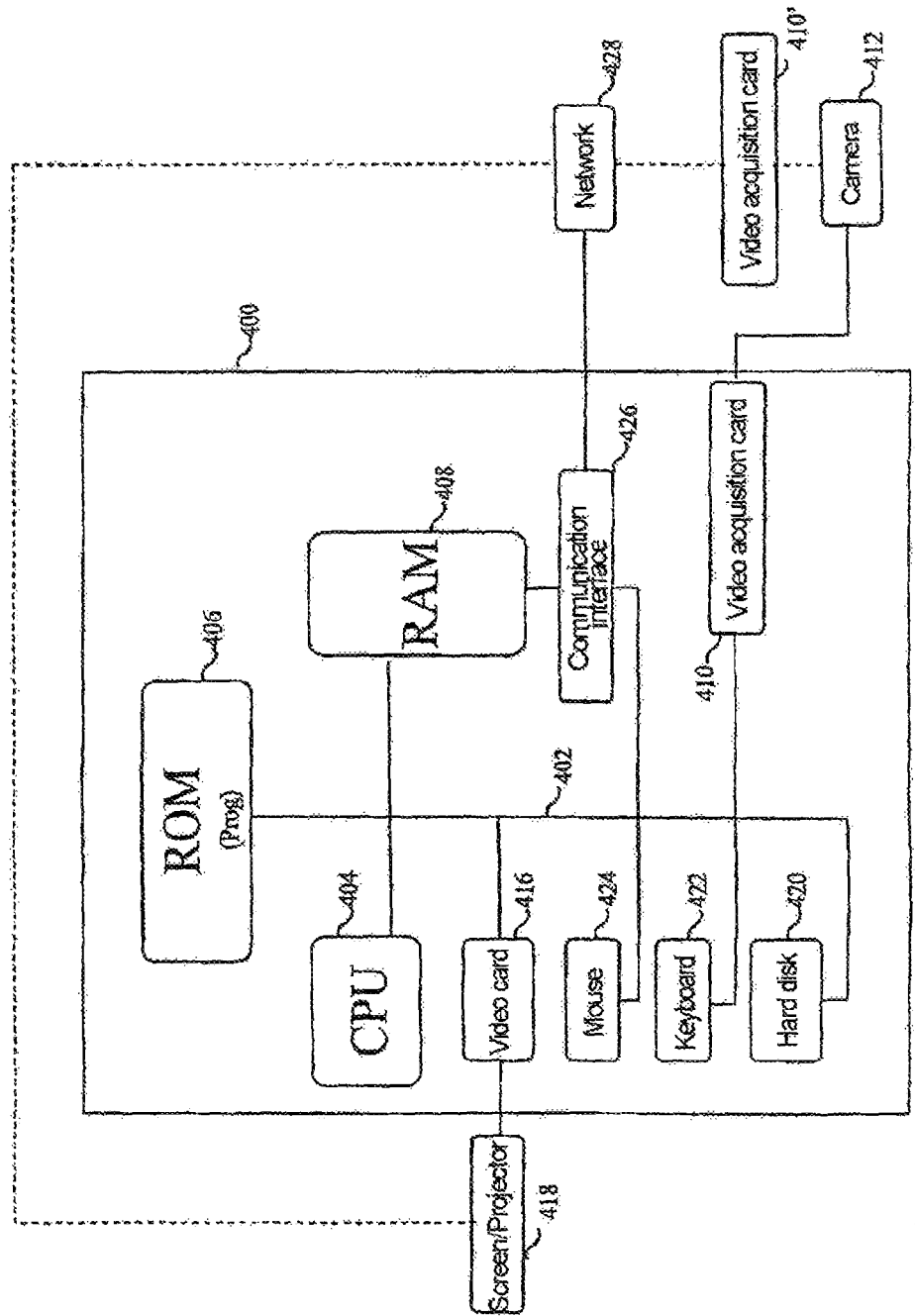
FIG. 4 shows one example of a device for at least partly implementing the invention.

FIG. 4 represents diagrammatically a device adapted to implement the invention. The device 400 is a microcomputer, a workstation or a gaming console, for example.

The device 400 preferably includes a communication bus 402 to which are connected:

a central processing unit (CPU) or microprocessor 404;

a read-only memory (ROM) 406 that can contain the operating system and programs and programs such as "Prog";

a random-access memory (RAM) or cache memory 408 including registers adapted to store variables and parameters created and modified during execution of the above programs;

a video acquisition card 410 connected to a camera 412; and a graphics card 416 connected to a screen or projector 418.

The device 400 can optionally also include the following:

a hard disk 420 that can contain the aforementioned programs "Prog" and data processed or to be processed in accordance with the invention;

a keyboard 422 and a mouse 424 or any other pointing device such as a light pen, a touch-sensitive screen or a remote control enabling the user to interact with the programs of the invention;

a communication interface 426 connected to a distributed communication network 428, for example the Internet, this interface being adapted to transmit and receive data;

a data acquisition card 414 connected to a sensor (not shown); and a memory card reader (not shown) adapted to read or write therein data processed or to be processed in accordance with the invention.

The communication bus provides for communication and interworking between the various elements included in the device 400 or connected to it. The representation of the bus is not limiting on the invention and, in particular, the central processing unit can communicate instructions to any element of the device 400 directly or via another element of the device 400.

The executable code of each program enabling the programming device to implement the method of the invention can be stored on the hard disk 420 or in the read-only memory 406, for example.

Alternatively, the executable code of the programs could be received via the communication network 428, via the interface 426, to be stored in exactly the same way as described above.

The memory cards can be replaced by any information medium such as, for example, a compact disc (CD-ROM or DVD). As a general rule, the memory cards can be replaced by information storage means readable by a computer or by a microprocessor, integrated into the device or not, possibly removable, and adapted to store one or more programs the execution of which executes the method of the invention.

More generally, the program or programs can be loaded into one of the storage means of the device 400 before being executed.

The central processing twit 404 controls and directs the execution of the instructions or software code portions of the program or programs of the invention, which instructions are stored on the hard disk 420 or in the read-only memory 406 or in the other storage elements cited above. On power up, the program or programs that are stored in a non-volatile memory, for example the hard disk 420 or the read-only memory 406, are transferred into the random-access memory 408, which then contains the executable code of the program or programs of the invention, together with registers for storing the variables and parameters necessary to implementation of the invention.

It should, be noted that the communication device including the device of the invention can equally be a programmed device. That device then contains the code of the computer program or programs, for example fixedly programmed into an application specific integrated circuit (ASIC).

Alternatively, the image from the video card 416 can be transmitted to the screen or projector 418 via the communication interface 426 and the distributed communication network 428. Likewise, the camera 412 can be connected to a video acquisition card 410' separate from the device 400 and images from the camera 412 transmitted to the device 400 via the distributed communication network 428 and the communication interface 426.

Because of the simplification of implementation provided by the automatic initialization and reinitialization method of the invention, the object tracking application can be used without recourse to a specialist. The tracking application can be used in the standard way to track an object in a sequence of images from a video stream, for example to embed a video sequence in an object from the scene taking into account the position and the orientation of that object, but also to determine the movement of a camera according to the analysis of a static object from the scene. In this case, the object is part of the scene and finding the pose of that object in the scene therefore amounts to finding the pose of the camera relative to it. It then becomes possible to add virtual elements to the scene provided that the geometrical transformation between the object and the geometrical model of the scene is known. This is the case. This approach therefore authorizes augmentation of the real scene with animated virtual objects that move as a function of the geometry of the scene.

If Rf is the frame of reference associated with the tracked object, Rs is the frame of reference associated with the scene, Rk is the frame of reference associated with the camera and Rm is the frame of reference of the animated 3D model, it is necessary to define the transform $T_{f \to c}$ from the frame of reference Rf to the frame of reference Rc, using the (known) transform $T_{f \to s}$ from the frame of reference Rf to the frame of reference Rs and the transform $T_{s \to m}$ from the frame of reference Rs to the frame of reference Rm. The affine transformation for going from the frame of reference Rm associated with the virtual three-dimensional model to the frame of reference Rc of the camera is determined by the following equation:

$$P_{Rc} = T_{f \to c} \cdot T_{f \to s}^{-1} \cdot T_{s \to m}^{-1} \cdot P_{Rm}$$

in which $P_{Rc}$ is the transform of the point $P_{Rm}$ defined in the frame of reference Rm of the three-dimensional model and $T_{i \to j}$ is the affine transformation for going from the frame of reference i to the frame of reference j. The above equation can be simplified into the following form:

$$P_{Rc} = T_{f \to c} \cdot T_{s \to f} \cdot T_{m \to s} \cdot P_{Rm}$$

that is $$P_{Rc} = T_{m \to c} \cdot P_{Rm}$$

The projection of the point $P_{Rm}$ as a function of the parameters of the camera, which can be expressed in the form of the matrix $P_l$, yields the point $P^i_{Rc}$ defined in the image from the camera. The point $P^i_{Rc}$ is thus defined by the following equation:

$$P_{Rc}^i = P_l \cdot T_{m \to c} \cdot P_{Rm}$$

Thus a synthetic three-dimensional object defined in the frame of reference of the scene can be projected onto the current image from the video stream to augment the video stream with animated virtual objects.

The tracking application can also be used as an interface with a mobile device such as a PDA (Personal Digital. Assistant), a mobile telephone, or any other device provided with a video sensor.

In particular, the application can consist in locating and then tracking in the image a textured rectangle learned previously, for example stored in an object database, in order to augment the real video stream with virtual models or secondary video streams locked onto the object. The main benefit of this technology stems from the fact that the camera and the tracked object can be moved freely within the scene. The change of frame of reference geometrical processing is identical to that described above.

The object tracking algorithm is particularly robust for current low-quality standards such as the H.263 standard often used to send and receive video streams to and from a telecommunication server. Moreover, it is possible to send control and command information using the keys of the mobile device, for example using DTMF (Dual Tone Modulated Frequency) signaling in the infrastructure of the telecommunication operator.

In this type of application, the object tracking and/or video stream enrichment processing can be local or remote. FIG. 5, comprising FIGS. 5a and 5b, shows two examples of architectures that can be used FIG. 5a corresponds to a remote tracking technique. The mobile device 500 includes a transceiver 505 for transmitting the video stream to the server 510, which includes a transceiver 515. The server 510 has an object tracking and video stream enrichment application so that the server 510 is adapted to receive one or more video streams from one or more mobile devices 500, to track an object in the images of that stream, to integrate a virtual object or a secondary video stream into those images and to transmit the video stream modified in this way to the mobile devices 500 that display it. FIG. 5b shows an alternative whereby the object tracking and video stream enrichment application is integrated into the mobile device 500'. The server 510' contains an application, for example a game, controlled by the controls of the mobile device 500'. The data exchanged between the server 510' and the mobile device 500' consists of control and command instructions and general information such as the results of executing control and command instructions. The video stream does not need to be transmitted between the transceivers 505' and 515'. Whatever architecture is used, it should be noted that the server receives information on the type of object to be tracked, the position of the camera relative to the object to be tracked, and preferably the various actions effected by the user.

FIG. 6 shows one example of using a mobile image capture and display device for an augmented reality application with object tracking using one of the architectures shown in FIG. 5. The mobile device 600 includes an image sensor (not shown) for acquiring a video stream from a real scene 610 and a screen 605. The real scene 610 includes an object 615 that must be tracked, on which appears an illustration 620 that serves as texture. In this example, the scene containing the tracked object is projected onto the screen 605 and the position of this object in the scene enables addition of a virtual object such as the dialog 625 or the animated three-dimensional virtual object 630.

As shown in FIG. 7, the mobile device can also be used as a cursor with six degrees of freedom or a movement sensor with six degrees of freedom according to the pose (position and orientation) of the mobile device relative to the tracked object. This cursor or sensor can be used to control movements. Four types of displacement can be envisaged.

In a "pointer" type first displacement mode, the mobile device simulates a pointing tool to guide actions, point to and select areas or objects and where appropriate displace the selection. It is considered here that the plane texture is placed on a real plane surface such as a table. A target is displayed on the screen on the optical axis of the image sensor of the mobile device. It is deformed according to the position of the camera because of its virtual projection on the table. The target object projected on the table is an ellipse, or some other two dimensional geometrical object. It is also necessary to determine the intersections between the direction given by the optical axis of the camera and the three-dimensional virtual objects placed on the table in order to be able to effect actions on those three-dimensional objects. Finally, it is important to be able to determine if the virtual target attached to the table partly covers a virtual object in order to be able to select it. The various applications to which this pointing device relates are mainly video games and especially simulation, racing and shooting games.

A first step expresses in the plane of the table the equation of the ellipse resulting from the intersection of the cone centered on the optical axis and the plane of the table. The radius of the cone is advantageously a parameter that can be set using the keys of the telephone and is expressed linearly as a function of the distance according to the function $f(z_d)=r$, for example $f(z_d)=az_d$ where a is a parameter that can be modified by the user and $z_d$ is the real distance between the plane of the table and the camera. For clarity, it is considered here that the frame of reference Rf of the tracked object is identical to that of the table, the x-y plane corresponding to the plane of the table and the z axis being directed upward. The plane of the table therefore has the equation z=0.

In the frame of reference Rf, the axis of the cone, i.e. the optical axis, is defined by the position of the camera $P_c=[x_c\ y_c\ z_c]^T$ and by the vector $\vec{t}=[x_t\ y_t\ z_t]^T$. The intersection I of the axis of the cone and the plane of the table is therefore determined in the following manner:

$$\begin{pmatrix} x_i = x_c - \frac{z_c}{z_t} \cdot x_t \\ y_i = y_c - \frac{z_c}{z_t} \cdot y_t \\ z_t = 0 \end{pmatrix}$$

Knowing this intersection point I, it is possible to deduce from it the distance between this point and the camera and thus to determine the radius b of the circle of the cone whose center is the intersection point I, following manner:

It is then possible to deduce the following equation of the ellipse in the plane of the table according to the frame of reference of the tracked object:

$$\frac{(x\cos\gamma + y\sin\gamma - x_t)^2}{a^2} + \frac{(y\cos\gamma + x\sin\gamma - y_t)^2}{b^2} = 1$$

where γ represents the angle between the projection of the y axes of the frames of reference linked to the camera and to the tracked object in the plane of the table. This equation is used to represent the ellipse in the image and to determine if an element of the image is part of the ellipse, i.e. if that element can be selected or not.

A second displacement mode enables the user to move instinctively in a virtual environment as if the camera were placed at their eye level. This displacement mode is especially suited to "first person shooter" type games and to virtual museum visit type applications. Movement sensing is effected from any reference position in the three-dimensional space. This reference position can be modified at any time on command. Small movements of the user relative to this reference position are captured and transmitted to the application. This approach provides for displacements with six degrees of freedom in a virtual environment.

The list of movements associated with these displacements relative to the reference point can be defined as follows:

the "go forward" movement, respectively the "go back" movement, is identified if the camera moves toward, respectively moves away from, the tracked object by a displacement along the optical axis of the camera;

a lateral translation is identified if the camera is displaced to the left or to the right along the horizontal axis perpendicular to the optical axis;

elevation movements in the virtual scene are identified by upward or downward translation of the camera;

looking to the left or to the right is identified by a rotation of the camera about the vertical axis;

looking up or down is identified by a rotation of the camera about the horizontal axis perpendicular to the optical axis; and leaning the head to the left or to the right is identified if the camera effects a rotation about the optical axis.

These displacements are naturally valid only if the tracked object is present in the field of the camera. If not, the last position is stored until the tracked object again enters the field of the camera.

The user employs a third displacement mode to control the displacement of a virtual object or character seen by the user. This kind of displacement mode is especially suited to video games and exploration games. Movement sensing is effected according to the pose difference between the frame of reference Rf of the tracked object and the frame of reference Rc of the camera. The movements of the virtual object or character are defined as follows:

the optical axis of the camera represents the scene as perceived by the virtual object or person;

a translation along the horizontal axis perpendicular to the optical axis provides for lateral displacement of the virtual object or character; and magnification of the scene (zooming on virtual objects) is determined by the distance between the camera and the tracked object.

Rotations about the optical axis and translations along the vertical axis have no predefined function, of course, and can correspond to a particular use as a function of the target application type.

In the fourth displacement mode movement capture is effected directly between the pose difference of the frame of reference Rc of the camera and the frame of reference RS of the tracked object. The objective of this mode is to inspect a virtual object or a virtual scene. It is thus possible to move around this element, toward it or from it. This displacement mode being very useful and highly intuitive, it is more particularly intended for educational and demonstration applications and video games.

As already mentioned, the system described improves the interactivity of numerous applications, especially in the field of games. The enrichment of the video stream combined with the control and cursor functions enables an interface suited to each application to be created, for example. By way of illustration, the following example concerns a Tamagosbi type game including different modes such as taming, feeding and communication. Thus the animal can sit up and beg when one moves toward it, get dizzy when one circles rapidly around it, and follow one when one circles gently around it. It can be beaten, for example to punish it, by displacing the camera rapidly from one side to the other. It is possible to reward it by tapping it on the head using a downward movement. A key on the keypad selects food while a movement of the camera toward the animal throws the synthetic 3D objet corresponding to that food. Different foods are available. It is equally possible to stroke the animal after moving slightly toward it. Different movements of the camera cause it to react differently. The animal can ask questions and the user can then respond yes or no (no downward, yes from left to right) and the responses are stored. A scenario can be created to render the discussion more intelligent.

Another type of application concerns audiovisual presentations in which virtual objects, animated or not, or video streams are added in real time. Such applications are used in particular in the broadcast or stand up cabinet field. According to the invention, during a presentation, an animator can freely manipulate a picture, in orientation and in position, and display a video stream or virtual information in the picture, which preferably includes one or more areas of uniform color corresponding to the location at which the secondary video stream must be inserted, for example using the chromakey technique. Virtual objects are inserted relative to the current pose of the picture. To facilitate tracking of the picture it can also contain a textured area, for example on the exterior or at the center. The animator is then in particular in a position to start a report using the picture: a technician in the wings triggers the display of a video stream in the picture and the animator then launches the subject by moving the picture toward the camera. The display window of the video stream then exits the picture and replaces the current video stream. An important aspect of this application is that the animator can pass their hand in front of the picture and partly block the video stream. Thus the animator can point to an element of the video stream shown on the picture. To make the system more robust and in particular to avoid the vibrations that are generally present in picture tracking applications, the dimensions of the images of the secondary video stream are here greater than those of the area or areas of uniform color to be covered. Thus a slight offset of the secondary video stream shown on the picture does not allow an area of uniform color to appear.

Other applications such as virtual visits to a museum or a building can also be easily implemented.

Although the foregoing examples are based on the use of a single camera, it is possible to use a number of cameras simultaneously and therefore allow cooperation between a number of users located in the same real environment, for example. It is therefore necessary to be placed in a common frame of reference such as the frame of reference of one of the cameras or the frame of reference of the tracked object, which is the same for the various cameras, and to project into the image from each camera according to the frame of reference associated with each camera.

It is necessary to determine the transformation for finding the relative position and orientation of the users. The following equation transforms the coordinates of a point expressed in the frame of reference of the camera n into coordinates expressed in the frame of reference of the camera 1:

$$P_{R_1} = T_{f \to c_i} \cdot T_{c_n \to f} \cdot P_{R_n}$$

where $P_{R_1}$ represents the coordinates of the point P in the frame of reference of the camera 1, $P_{R_n}$ represents the coordinates of the point P in the frame of reference of the camera n and $T_{i \to j}$ is the affine transformation that goes from the frame of reference i to the frame of reference j. The foregoing transformation can then be written in the following simplified form:

$$P_{R_1} = T_{C_n \to c_i} \cdot P_{R_n}$$

It then remains only to effect the projection as a function of the parameters of the cameras (matrix $P_1$) in order to find the coordinates of the point $P_{R_n}$ in the image, which yields the following, equation:

$$P_{R_c} = P_1 \cdot T_{m \to c} \cdot P_{R_n}$$

Using a number of cameras makes it possible, for example, to implement applications offering users the possibility of moving simultaneously and tracking the same object. One example of such applications relates to games, for example car, aircraft or motorcycle racing games. The control principle used for a racing game corresponds to the first displacement mode, of "pointer type", or to the third mode enabling users to control the displacement of virtual objects that they see. It enables a number of players located in the same real environment to compete on a three-dimensional circuit positioned relative to the tracked object in the real scene. Each of the users controls a machine, and the collaborative mode enables the machines to interact within the application. It is equally possible to use this feature for board games. Using a board downloaded and printed out, it is possible to consider a whole range of collaborative applications. Games that use a board and pieces can therefore be simulated by three-dimensional virtual objects. The keys of the keypad can then operate on the configuration of the game and enable live competition with other players. Similarly, sports games, for example tennis games, can be implemented. For this type of application, the displacement mode used is preferably the third mode enabling users to control the displacement of virtual objects that they see. The orientation of the line of sight of the camera thus gives the orientation of the character in the game. A key of the keypad advantageously enables a player to strike the ball when it arrives close to them. The reference position simplifies forward and backward displacements, by moving the camera in translation on its line of sight. For lateral displacements, lateral movements of the user are taken into account.

Naturally, to satisfy specific requirements, a person skilled in the field of the invention can apply modifications to the foregoing description.

What is claimed is:

1. A method for tracking in real time an object from a real scene in a video stream, the method comprising:
   receiving a first image from said video stream, wherein the first image includes an object to be tracked;
   determining a pose of the object being tracked in the first image based on a comparison between the pose of the object being tracked and a plurality of image blocks, wherein each image block of the plurality of image blocks is associated with a unique pose;
   creating a key image including the pose of the object being tracked;
   receiving a second image from the video stream, wherein the second image includes the object to be tracked; and
   evaluating the pose of the object to be tracked in the second image based on the key image.

2. The method according to claim 1, further comprising determining an appropriate plurality of image blocks based on at least one textured image of the object to be tracked.

3. The method according to claim 1, further comprising replacing values of the key image with values of the pose of the object to be tracked in the second image from the video stream.

4. The method according to claim 1, wherein, the object being tracked includes an area of uniform color adapted to use chromakey technology.

5. The method according to claim 1, further comprising inserting an element in the received image according to the evaluated pose of the object being tracked, wherein the element is selected from a list comprising at least one representation of at least one virtual object and at least one second video stream.

6. The method according to claim 1, further comprising determining at least one control command, wherein the at least one control command is determined according to a Variation of the pose of the object being tracked.

7. The method according to claim 1, further comprising transmitting at least one indication relating to a variation of the pose of the object being tracked.

8. The method according to claim 1, further comprising:
   acquiring the first and second images; and
   at least partially displaying the first and second images.

9. A computer program stored on a non-transitory computer readable storage medium that when executed by a computer causes the computer to perform a method for real-time tracking of an object from a real scene in a video stream, the method comprising:
   receiving a first image from said video stream, wherein the first image includes an object to be tracked;
   determining a pose of the object being tracked in the first image based on a comparison between the pose of the object being tracked and a plurality of image blocks, wherein each image block of the plurality of image blocks is associated with a unique pose;
   creating a key image including the pose of the object being tracked;
   receiving a second image from the video stream, wherein the second image includes the object to be tracked; and
   evaluating the pose of the object to be tracked in the second image based on the key image.

10. A device for real time tracking of an object from a real scene in a video stream, comprising:
    a processor;
    a memory coupled to the processor, wherein the processor executes a program code stored in the memory to:
    receive a first image from said video stream; wherein the first image includes an object to be tracked;
    determine a pose of the object being tracked in the first image based on a comparison between the pose of the object being tracked and a plurality of image blocks, wherein each image block of the plurality of image blocks is associated with a unique pose;
    create a key image including the pose of the object being, tracked;
    receive a second image from the video stream, wherein the second image includes the object to be tracked; and
    evaluate the pose of the object to be tracked in the second image based on the key image.

11. The device according to claim 10, wherein the processor is further configured to execute the program code stored in the memory to determine whether the pose of the object being tracked can be evaluated in the second image based on data stored in a first storage means.

12. The device according to claim 10, wherein the processor is further configured to execute the program code stored in the memory to store the second image and the pose of the object being tracked in the second image in a first storage means.

13. The device according to claim 10, wherein the processor is further configured to execute the program code stored in the memory to determine the pose of the object being tracked from which said at least one video stream is obtained in one of the frames of reference linked to said real scene or to said at least one object to be tracked.

14. The device according to claim 10, wherein the processor is further configured to execute the program code stored in the memory to insert an element into the at least one of said received images according to the evaluated pose of the object being tracked in said received image, wherein the at least one element is contained in a list comprising at least one representation of at least one virtual object and at least one second video stream.

15. The device according to claim 10, wherein the processor is further configured to execute the program code stored in the memory to receive the first and second images from at least one mobile telephone.

* * * * *